US006654459B1

(12) United States Patent
Bala et al.

(10) Patent No.: US 6,654,459 B1
(45) Date of Patent: *Nov. 25, 2003

(54) ENHANCED AGENT AUTHENTICATION IN VIRTUAL CONTACT CENTER

(75) Inventors: Srinivas Bala, Dayton, NJ (US); Mark Jeffrey Foladare, Kendall Park, NJ (US); Kathleen C. Fowler, Manasquan, NJ (US); Shelley B. Goldman, East Brunswick, NJ (US); Shaoqing Q. Wang, Middletown, NJ (US); Roy Philip Weber, Bridgewater, NJ (US); Robert S. Westrich, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,895

(22) Filed: Jan. 27, 2000

Related U.S. Application Data

(63) Continuation-in-part of application No. 08/933,518, filed on Sep. 18, 1999, now Pat. No. 6,049,602, which is a continuation-in-part of application No. 09/318,015, filed on May 25, 1999.

(51) Int. Cl.[7] .......................... H04M 3/00; H04M 5/00; H04L 9/00

(52) U.S. Cl. ................................. 379/265.04; 713/168
(58) Field of Search ........................... 379/265.02, 309, 379/219, 220.01, 265.03, 265.04; 709/200–203; 713/168–170; 370/352; 455/410, 411

(56) References Cited

U.S. PATENT DOCUMENTS 6,157,826 A * 12/2000 Lee ........................... 455/411
6,381,454 B1 * 4/2002 Tiedemann et al. ......... 455/419

* cited by examiner

Primary Examiner—Benny Tieu

(57) ABSTRACT

A virtual contact center system includes facilities for delivering voice authentication prompts upon callback to a CSR who has logged in via a computer link. More particularly, in an illustrative embodiment of the present invention a voice response unit (VRU) provides a voiced sequence of random characters to a CSR under the control of a contact control server. Upon receipt of the sequence, the CSR seeking authentication keys in the same or a related character sequence for delivery over the computer link to the contact control server. When the keyed sequence from the CSR is received at the contact control server in an expected form, the CSR is determined to be authentic. In appropriate cases, either or both of the voice prompt from the contact control center VRU or the keyed character sequence from the CSR may be encrypted to further raise the certainty of authentication.

22 Claims, 2 Drawing Sheets

ENHANCED AGENT AUTHENTICATION IN VIRTUAL CONTACT CENTER

RELATED APPLICATIONS

This application is a continuation-in-part application based on earlier applications:

(i) M. J. Foladare, et al, entitled Virtual Call Center, Ser. No. 08/933,518, filed Sep. 18, 1999; now U.S. Pat. No. 6,049,602 which is a continuation-in-part of (ii) M. J. Foladare, et al, entitled Method and System for Providing Communication Control Functionality at a Remotely Located Site, Ser. No. 09/318,015 filed May 25, 1999.

The cited parent applications are assigned to the same assignee as the present application, and are hereby incorporated by reference as if set forth in their entirety herein.

In addition, the present application is related to the following applications by the same inventors as the present application and filed on the same day as the present application; these applications are owned by the same assignee as the present application and are hereby incorporated by reference as if set forth in their entirety herein.

(iii) Control of Merchant Application by System Monitor in Virtual Contact Center;

(iv) Virtual Contact Center Serving Public Transaction Terminals;

(v) Virtual Contact Center with Enhanced Language Capabilities;

(vi) Virtual Contact Center with Flexible Staffing Control.

FIELD OF THE INVENTION

The present invention relates generally to the field of communications systems. More particularly, the present invention relates, in one aspect, to communications contact centers, including distributed or virtual call center functionality. Still more particularly, aspects of the present invention relate to virtual contact centers incorporating systems and methods for performing agent authentication in networks in which DTMF signaling facilities are not universally available.

BACKGROUND OF THE INVENTION

Previous patent applications (i) and (ii) cited above, describe network-based call centers featuring interaction between calling parties, a call control server, a merchant server and one or more agents or customer service representatives (CSRs), which CSRs may be distributed over a number of locations remote from the customer and servers. Using high speed data networks, including the Internet, and/or the public switched telephone network (PSTN) customers contact CSRs in a controlled manner, with sufficient information available at CSR stations to answer customer questions, receive customer orders, or otherwise to serve customer needs. Such network arrangements are referred to as virtual call centers.

In some cases, a customer will originate a telephone call that is extended to a CSR exclusively over the PSTN, but under the control of the call control server. In other cases, a customer may be in controlled contact with a CSR exclusively over a data connection, and in other cases contact between the customer and CSR will include both a data network portion and a PSTN portion. Callback techniques, by which calls are originated by a CSR in response to a contact made by a customer to a merchant location over a data link, prove attractive to customers for some merchant applications. Using well-known voice-over-IP (VOIP) techniques, a voice call may be carried over a data network for all or part of its extent.

Network controls to enhance network and transaction security typically include voice and CSR data terminal login procedures, and selective dissemination of merchant and control pages to CSRs and customers. Provision is readily made for CSRs to login and logoff at the beginning and end of a work shift, and to accommodate periodic CSR breaks. Additionally, when customer calling rates are not sufficient to keep scheduled CSRs occupied, the earlier-described systems and methods provide flexibility in temporarily releasing CSRs to pursue other activities. Because CSRs may be working from home or other non-traditional workplaces, such flexibility often proves very attractive to CSR personnel.

While the term customer is clearly appropriate for network-based sales transactions using the described techniques, the term applies equally well when callers seek information, assistance and other services as well. Thus, for example, the prior teachings of incorporated patent applications (i) and (ii) will prove useful in providing library and other reference and consulting functions, in emergency and disaster applications, in political and other polling applications and a host of other applications. Incorporated patent applications (iii) through (vi) cited above likewise further illustrate (but by no means exhaust) contexts and services to which the prior inventive teachings may be applied. Simplicity of presentation dictates that the present description be based on an illustrative sales transaction context, i.e., the merchant will be assumed to be a supplier of goods or services. Those skilled in the art will recognize that the present inventive systems, techniques and principles will also apply to many other particular contexts. The term merchant will therefore be understood to include many non-merchant contexts, e.g., emergency service call centers.

Problems to be Solved

While solutions provided by the several incorporated patent applications prove very useful for a wide variety of virtual call center network configurations and for many diverse applications, considerable reliance is placed in these contexts on verification of the identity of customer service representatives (CSRs). Thus, a number of login procedures are described in the incorporated prior patent applications that help establish the authenticity of a CSR and his/her interactive environment. In one aspect, such login procedures employ a voice callback from a call control server or other network device having security responsibilities.

Thus, when a CSR logs in to a virtual call center call control server using a computer login procedure from a CSR work site, certain aspects of the computer can be authenticated. To further authenticate the CSR and the location from which the CSR is participating in the VCC, a voice callback over a voice network such as the public switched telephone network (PSTN) is typically placed to the PSTN address (i.e., the POTS number) for an approved CSR site.

While the operational site for a CSR may, in general, be moved, the CSR and call control server must agree on its identity and location to ensure a proper level of security for processing customer calls. When a callback by the call control server to the agreed POTS number is placed following a computer login by the CSR, the authentication process is advantageously advanced by presenting a voice message to the CSR requesting that a sequence of signals be keyed by the CSR using a telephone keypad to send dual tone multi-frequency (DTMF) signals. In some cases, however, such DTMF signaling is not available, thus preventing this important authentication step from being accomplished.

SUMMARY OF THE INVENTION

Limitations of the prior art are overcome and a technical advance is made, and the above-cited and other problems are solve in accordance with the present invention described in illustrative embodiments herein.

A virtual call center system includes facilities for delivering voice authentication prompts upon callback to a CSR who has logged-in via a computer link. In an illustrative embodiment of the present invention a voice response unit (VRU) provides such voice prompts to a CSR under the control of a VCC call control server. The voice prompts are advantageously in the form of a sequence of random characters generated at the call control server. Upon receipt of such voice prompts, the CSR seeking authentication then keys in the character sequence at his/her computer terminal for delivery over the computer link to the call control server. When the keyed sequence from the CSR is received at the call control server in an expected form, the CSR is determined to be authentic.

In appropriate cases, the either or both of the voice prompt from the call control center VRU or the keyed character sequence from the CSR may be encrypted to further raise the certainty of authentication. In some embodiments, the prompt sent to a CSR may be a data prompt sent via the computer link.

BRIEF DESCRIPTION OF THE DRAWING

The above-summarized description of illustrative embodiments of the present. invention will be more fully understood upon a consideration of the following detailed description and the attached drawing, wherein.

DETAILED DESCRIPTION

Illustrative System Overview

Figure 1:
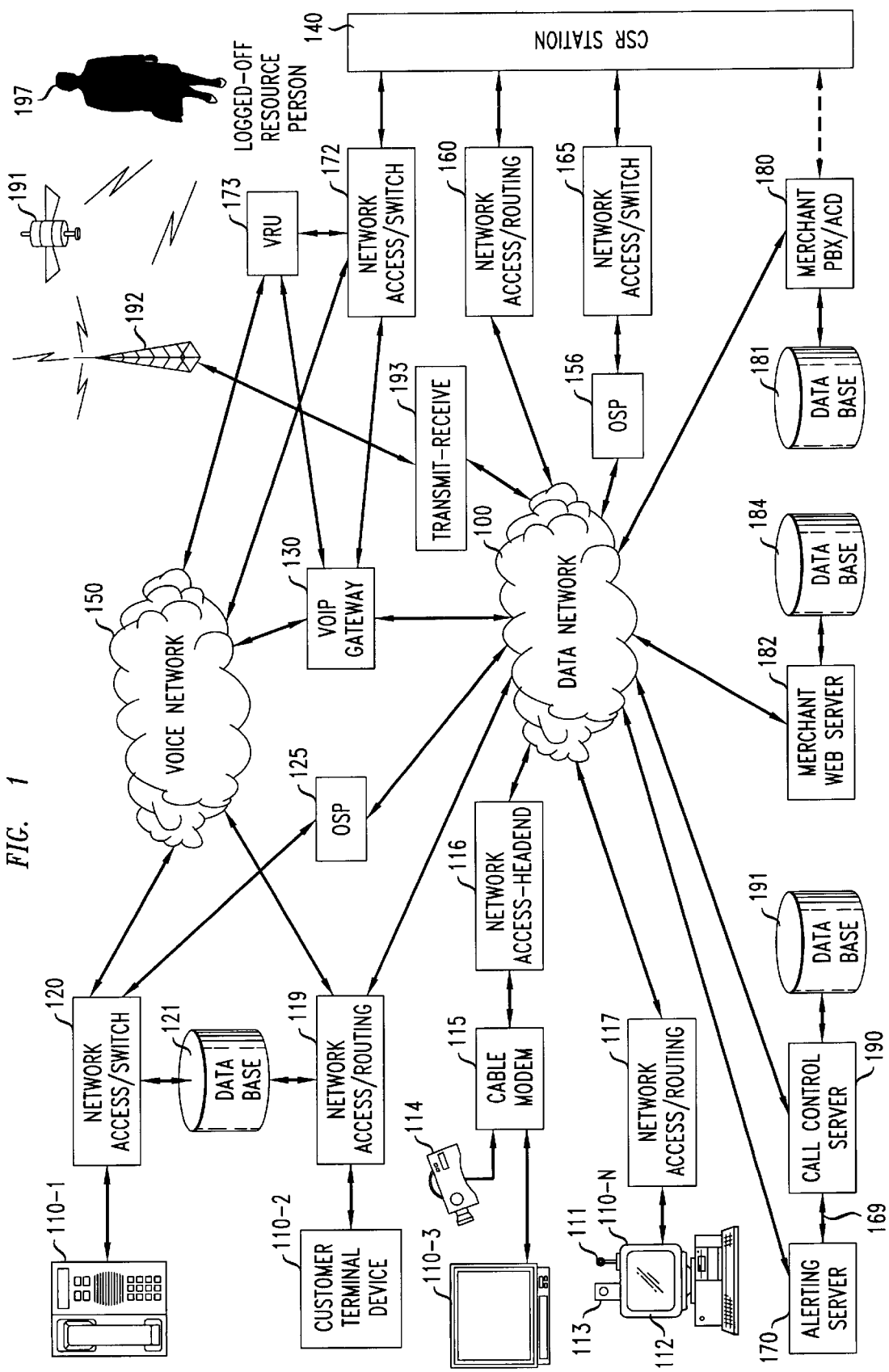
FIG. 1 is an overall view of a network-based call center system including elements of an illustrative embodiment of the present invention.

FIG. 1 shows an illustrative network-based call center system including an illustrative embodiment of the present invention. That system is based generally on the teachings of the incorporated applications (i) and (ii), but also includes elements for achieving current inventive features.

More particularly, FIG. 1 shows a plurality of customer terminal devices 110-i,i=1, 2, . . . , N, interacting through a voice network 150 and/or a data network 100 with one or more CSR stations (an illustrative one of which is identified as 140), a web merchant web server 182, and a call control server 190. The "voice" network 150 is typified by the PSTN, or portions thereof, though it will be recognized that modem and other data signals routinely traverse such voice networks.

Illustrative customer terminal devices for use in the system of FIG. 1 include telephone station equipment 110-1. This telephone station equipment is shown connected through a network access device, including, as appropriate to the caller, a PBX or other switch (or other access device, including dedicated line/trunk facilities) 120 providing access to network 150, and, via online service provider (OSP) 125, to data network 100. Switch/access device 120 illustratively is provided access to a network database 121 for, among other purposes, obtaining routing information, as for routing 8xx calls.

Another customer terminal device shown in FIG. 1 is an interactive video arrangement including a television or other display 110-3 (including loudspeakers) and video camera (including audio pickup) 114 connected through an illustrative cable modem 115 to a network access device, typically a cable head end system 116, to data network 100. It will be recognized by those skilled in the art that in one configuration, some or all of the combination of display 110-3, camera 114 and modem 115 may be integrated as a single device adapted for communicating over a broadband data network, such as the Internet.

Terminal 110-N shown in FIG. 1 is a personal computer or workstation having typical processor, memory and input/output facilities (including a sound card and associated software), and typically running an operating system with a graphical user interface and a browser or similar software for accessing, downloading and displaying World Wide Web (WWW) materials. Like terminal 110-3, terminal 110-N will typically include audio and video input devices, represented by microphone 111 and video camera 113, and normal audio output (not shown). Add-in software such as QuickTime from Apple Computer Corp. and a current version of Real-Player from RealNetworks, Seattle, Washington, provide real-time video and audio communication between terminal 110-N and IP network devices. Other commercially available software, advantageously compatible with ITU Recommendation H.323 also proves useful in providing real-time multimedia communications between devices connected to network 100.

Terminal 110-N, with its peripherals, gains access to data network 100 through an appropriate network access/routing device 117, which may be a modem for voice grade lines through an OSP or other access service, or a broadband access device such as an ADSL or cable modem through an appropriate network access connection.

To emphasize that customer terminal devices 110-i are not limited to traditional computer and telephony devices, FIG. 1 includes customer terminal device 110-2. Device 110-2 may include any or all of any of the other devices 110-i and, in addition or instead, may include sensors of many kinds, whiteboard input/output devices or other input/output devices. Similarly, customers may access CSR personnel using portable handheld devices such as cellular telephones and portable computers and other Internet access devices. In each case access to one or more data networks, such as network 100, or a voice network, such as 150 in FIG. 1, is accomplished using well-known access interconnection devices and media appropriate to the customer terminal device used. As shown in FIG. 1 a network access device such as 119 in FIG. 1 will, in some applications, employ a network database for additional routing or control purposes.

A single illustrative CSR station 140 is shown in FIG. 1 to avoid unnecessary clutter in that figure. However, it will be recognized that, in general, a plurality (often many) such CSR stations will be logged-in through data network 100 and, in appropriate circumstances, voice network 150 for purposes of voice and/or data communication with one or more customers at customer terminal devices 110. The incorporated patent applications (i) and (ii) describe appropriate login procedures that prove useful in authenticating both the CSR station (in the form of a computer authentication and/or telephone authentication) and the CSR him/herself. While CSR station 140 usually includes at least a telephone station and a computer/workstation generally of the types used by calling customers, it will be understood that other computational or communications devices, including those available to calling customers, will be available at a CSR station as requirements dictate.

Access by CSR station 140 to the network 150 is illustratively accomplished through a network switch, such as provided by a local access carrier (LEC). Such a switch, shown as 172 in FIG. 1 may access a database like that shown as 121 in FIG. 1. Thus, for example, station 140 may be part of a network-based virtual private network (VPN) defined and controlled by information stored in such a network database. The network database will be incorporated into switch 172 in appropriate cases.

Also shown connected to switch 172 is a voice response unit (VRU) 173 of standard design for generating voice messages for delivery to calling (or called) customers. Thus, for example, a caller to an 8xx number seeking connection to a CSR will often be asked to key, speak or otherwise indicate one of a plurality of items of identifying or selecting information—such as a class of products or a subset of services (e.g., technical support). A VRU message may, in appropriate cases be sent in response to a CSR-selection, e.g., an item selected on a merchant form or a clickable button on a CSR computer screen. A call control server 190 (to be described below) may also command the VRU to function in like manner.

CSR station 140 may connect to network 100 directly through a router or other network edge device shown as 160 in FIG. 1. Alternatively station 140 may access data network 100 through a dialup or other access arrangement or switch (shown as 165 in FIG. 1) and further through an OSP or other access service shown as 156 in FIG. 1. OSP 156 may, for example, include facilities provided by AT&T Worldnet (sm) Service.

In addition, network switch 172 may provide access by CSR station 140 to data network 100 (or vice versa) for voice communications by routing a call through a voice over Internet Protocol (VOIP) gateway well known in the art and shown as 130 in FIG. 1. Once a voice call from a CSR station enters data network 100 it may be delivered to a customer terminal in a form suitable to that terminal device. Thus, for example, voice data packets from the call may be routed to another (or the same) VOIP gateway for delivery over voice lines to a customer. See, for example, D. Minoli and E. Minoli, *Delivering Voice over IP Networks*, John Wiley & Sons, 1998.

Also shown in FIG. 1 are merchant PBX and Automatic Call Distributor (ACD) 180 connected to data network 180. This switch/ACD combination is well known in the art as the means usually employed in locally arranged or locally networked CSR stations to which an ACD distributes incoming calls. Database 181 is conveniently shown connected to merchant PBX/ACD 180 for purposes of providing customer and account information as required. Thus, depending on proximity to merchant PBX/ACD CSR station 140 may, if appropriately located with respect to merchant PBX/ACD 180 gain access to networks 100 and 150 (and to required accounting and related customer data) through such a merchant PBX/ACD. As noted above, CSR station 140 may be one of many similarly situated, though one or many other CSR stations may be distributed at locations geographically remote from a merchant PBX/ACD and each other. Thus, CSR station 140 is shown connected to merchant PBX/ACD 180 by broken lines; in some cases the indicated path will exist, while in others any such required voice or data exchanges are accomplished through data network 100, including VOIP connections thereto. The indicated broken-line path represents one or more voice lines, broadband links or other communications paths as appropriate to a particular circumstance.

As described in incorporated patent applications (i) and (ii), control of (among other things) calls to CSRs is accomplished largely by a call control server 190. Call control server 190 conveniently either includes or is in contact (directly or through a network) with a VRU, such as VRU 173, to direct the issuance of voice messages to calling customers. Call control server 190 also interacts with CSR station 140 for authentication of the user and computer, as is described in the incorporated patent applications (i) and (ii). Database 191, shown connected to call control server 190, is conveniently used to store and access information relating, inter alia, to CSRs, supervisors, consultants and other related personnel—and the logged-in (or not) status of each.

A variety of login and authentication of CSRs and CSR computers (and other CSR station elements) is described in detail in the incorporated patent applications (i) and (ii). In typical operation, each CSR initially logs in with call control server 190 using (among other possible login protocols) login ID and password information. Then, call control server 190 calls a voice terminal at CSR station 240 and illustratively delivers a voiced requirement to enter keyed inputs (such as a DTMF sequence) or voice inputs to be analyzed by call control server 190. When this procedure is successfully completed, a high level of certainty that the purported CSR and CSR station equipment is authentic. As noted above, however, there may be circumstances when such DTMF signaling is not available at a CSR location; this shortcoming will be circumvented as described more fully below.

Also shown connected to data network 100 in FIG. 1 is merchant web server 182 for making available online information, including merchant web pages, and other information that may be of use in conducting business online and in cooperation with CSRs. Call control server 190 advantageously interacts with merchant web server 182 to select, authenticate and otherwise control access to merchant information and CSRs for facilitating business on behalf of the merchant. Call control server 190 also advantageously interacts with merchant PBX/ACD 180 both in respect of controlling and coordinating call distribution to CSRs and others, and in respect to paging and related functions in some applications.

While shown independently connected to data network 100 in FIG. 1, merchant web server 182, merchant PBX/ACD 180 and call control server 190 (or some combinations of them) may be otherwise linked by a local area network (LAN), wide area network (WAN) or other network. In some cases merchant web server 182 may act as afront end for a call control server, e.g., a selection by a customer on a page downloaded from a merchant server may trigger one or more messages to a cognizant call control center from the merchant web server. It will be recognized that two or more of the merchant web server 182, merchant PBX/ACD 180 and call control server 190 may be combined in a multi-function network device in some embodiments of the present invention.

Of course, a call control server 190 can perform the same or related functions for each of a plurality of merchants, and each of a plurality of not necessarily mutually exclusive groups of CSRs. Thus, some CSRs may be qualified (or authorized) to work on behalf of two or more merchants, while others may not. In any event, call control server 190 is advantageously arranged to deliver ("push") web pages or other organized information to appropriate customers, CSRs and others (supervisors, specialists, etc.). It may prove useful in some applications to have separate (distributed) call control centers if appropriate for call-volume or geographical reasons, or for purposes of segregating calls associated with a particular merchant.

Enhanced Authentication Capabilities in a Virtual Call Center

Figure 2:
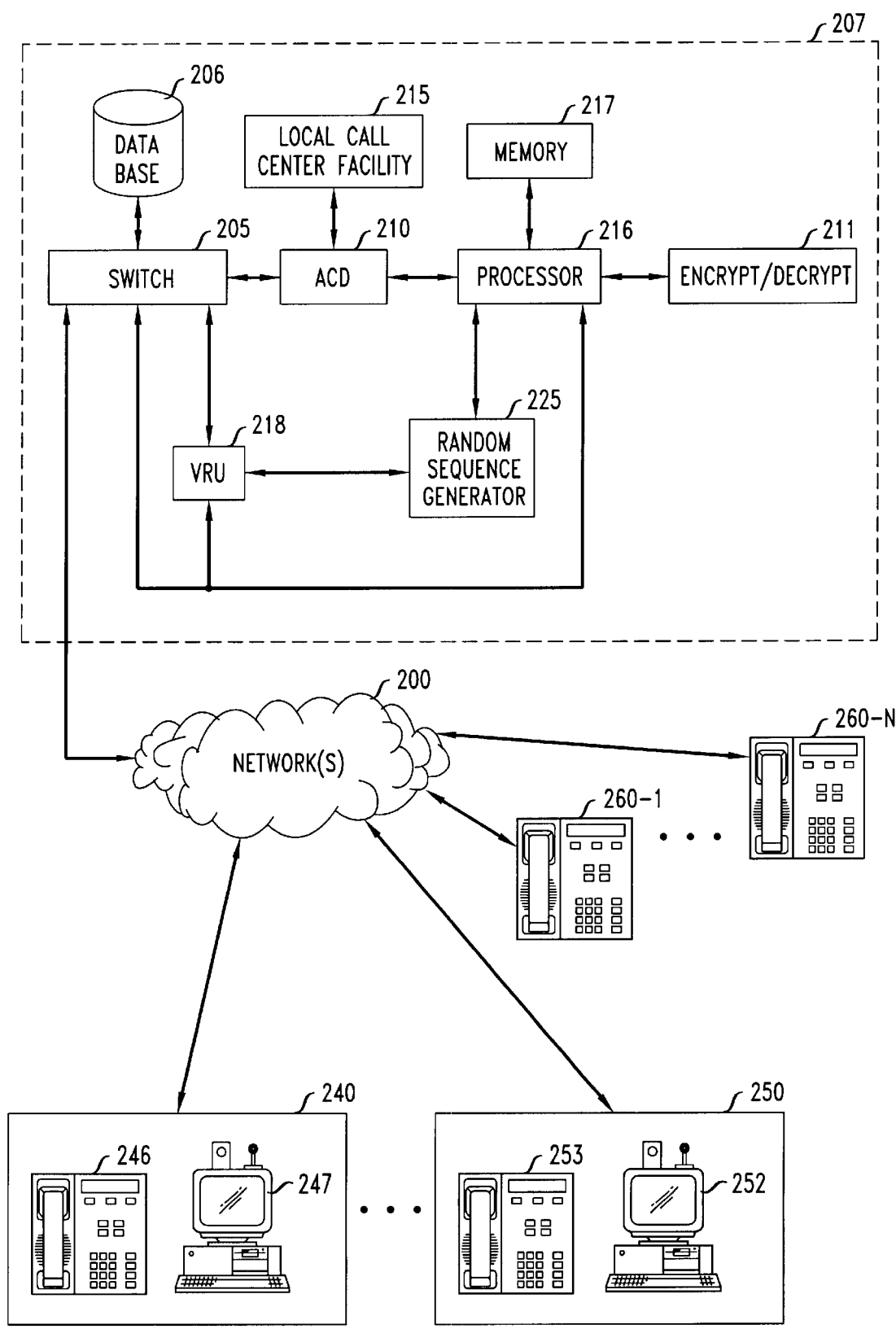
FIG. 2 shows illustrative authentication facilities at a call control server and other VCC facilities in accordance with an illustrative embodiment of the present invention.

FIG. 2 shows portions of the virtual call center system of FIG. 1 communicating over one or more networks 200 with illustrative CSR stations 240 and 250. In particular, broken-line box 207 represents portions of merchant PBX/ACD 180 (with the switch shown as 205 in FIG. 2) having an associated database 206. The switch is connected in well-known fashion to ACD 210, which, in turn, is shown connected to a local call center facility 215. While call center 215 represents a traditional call center, it will be recognized that one or more CSR stations, such as station 240 in FIG. 2 (generally of the form shown as 140 in FIG. 1) are also linked over networks 200 to, among other locations, switch 205. VRU 218 is shown connected through switch 205 to one or more of the networks 200. In some cases, VRU 218 will provide voice information and receive voice response in packet form, such as IP packets used for communication over the Internet.

Exemplary CSR stations 240 and 250 in FIG. 2 are but examples of CSR stations to which calls arriving at switch 205 and ACD 210 are directed under the direction of call control server 190 in FIG. 1. While the term CSR station is applied to stations 240 and 250, it should be understood that one or more such stations may be a supervisor, monitor or specialist station.

Illustrative CSR station 240 includes telephone 246 and a personal computer or workstation 247 including analog-voice-to-packet facilities, such as well known sound boards with appropriate packetizing software. Also shown included with illustrative computer system 240 are audio and video facilities such as a microphone and video camera, respectively. Software for controlling and packetizing audio and video signals is well known in the art and may include such software as is compatible with one or more industry standards, such as ITU Recommendation H.323. Not all CSR stations need include the full range of communications and computing facilities (e.g., video communications facilities), but each will have at least a computer and, where the computer does not provide for voice communications such as VOIP communications, a separate telephone connection will be provided.

FIG. 2 also shows a plurality of customer calling stations 260-1 through 260-N. For simplicity, these stations are shown as normal voice calling stations, though in appropriate cases, such calling stations may be video, computer terminal or other types of stations, including combinations of such types.

Call control processor 216, with associated memory 217, is also shown in FIG. 2 connected to switch 205. Processor 216 will, as appropriate to traffic and processor power, be one of several processors included within call control server 190. Processor 216 supplies switch 205 with a variety of control signals, including authentication control signals useful in embodiments of the present invention. FIG. 2 also shows random sequence generator 225 and (optional) encryption/decryption unit 211 as included in grouping 207. Random sequence generator 225 is of well-known design and, upon request by processor 216, produces a sequence of characters randomly selected for application to VRU 218, illustratively by way of processor 216. The effect, then, is to have VRU announce a sequence of characters, by way of switch 205, over links in networks 200 to a CSR who is seeking to be authenticated, as will be described further below.

Optional encryption/decryption unit 211 shown in grouping 207 in FIG. 2 is likewise of a standard design selected from any of a number of encryption protocols. Thus, for example, a public key protocol associated with a CSR offering his/her availability may be selected by call control server processor 216 to further ensure the security of a connection to a CSR. Public keys for authentic CSRs are illustratively stored in memory 217 or as auxiliary database entries in tables such as those described in incorporated patent application (v) cited above. Such encryption techniques may be used under any circumstances determined by call control server processor 216, as, for example, when a CSR is logging in from a not-previously-approved location. Such location (identified by a POTS number in a computer login) is used by the call control server to perform the above-mentioned callback to the proposed CSR location. In such use, the receiving CSR will employ appropriate decrypting techniques (e.g., using a private key) to discern the appropriate random sequence to be returned to the call control server. Of course, a CSR computer such as 247 in FIG. 2 will typically be used to perform the decryption at the CSR location. Such decryption, when used, will typically be performed after entry of the received (encrypted) voice message from VRU 218 at a CSR location such as 240 in FIG. 2.

After receipt of a voiced sequence of characters (and after decryption, when used), a CSR seeking to be authenticated at CSR location 240 will illustratively enter the same sequence in computer 247 for delivery to call control server processor 216 via one of networks 200 and switch 205. If the returned sequence (which likewise may be encrypted) matches the sequence generated by random sequence generator 225 (after decryption, when used), then the processor 216 will determine that the logging-in CSR is authentic. Henceforth, that CSR location will be used in connecting customer calls to the authenticated CSR interchangeably with CSRs at local call center facility 215 and other VCC locations.

As was noted above for other functional groupings, it will sometimes prove convenient to locate some or all of the elements shown included in grouping 207 in FIG. 2 at a common location or have these elements connected by a LAN or other particular network. More generally, however, the elements shown in FIG. 1 as separate entities, such as merchant PBX/ACD 180 and call control server 190 (each with an associated database) may, as well, communicate over networks 150 or 100 in FIG. 1 while achieving the inventive contributions described herein. In any event, networks 200 represents appropriate network facilities for connecting CSR terminals such as 240 to other elements of the system of FIG. 1. More particularly, networks 200 comprise a data network for receiving and delivering packet voice and, where appropriate, image data—as well as text, numerical and signaling information appropriate to the context. In some cases, networks 200 will include portions of the PSTN for some or all voice and low-tomoderate speed data content.

While the above-described authentication methods have been described in terms of one or more fixed CSR locations, it will be understood that current inventive teachings apply as well to mobile CSR locations. Such mobile applications may be especially appropriate when the CSR provides some expert functions from a variety of field locations rather than at a permanent home base. Depending on the sensitivity of information exchanged over links to particular mobile sites, a greater degree of encryption.

While responses from logging-in CSR locations (fixed or mobile) are described above as having a standard computer terminal or personal computer (such as 247 in FIG. 2), it will be understood that a variety of terminals, including various laptop computer configurations or handheld terminals, may be used in providing responding sequences to call control server 190 (via its illustrative included processor 216).

While VRU 218 is shown grouped with switch 205 and/or call control server processor 216, it will be appreciated that such VRU may be located separately from either or both. In particular, VRU 218 may serve a number of switches if desired.

While the voice prompt sent to a putative CSR seeking authentication has been described as a character sequence, such sequence may be any sequence of random signals that may be recognized by the recipient and translated into a corresponding sequence of signals that be entered into the recipient's computer for transmission to a call control server processor.

While encrypt/decrypt element 211 and random sequence generator 225 are shown as separate elements in grouping 207, it will be appreciated that these elements will, in appropriate cases be realized using software modules executing on processor 216 or an alternative processor connected to processor 216. Likewise, encrypt/decrypt facilities, if any, included at CSR locations such as location 240 in FIG. 2 will typically be realized using software modules executing on processors such as that in computer 247.

Though problems solved by the present invention are relevant to virtual call center contexts, it will be recognized that other contexts involving mobile workers or those having a plurality of work locations will benefit from use of the present invention. Further, workers other than CSRs who are at large, or work at home or in other virtual office locations—such as those described in co-pending U.S. patent applications Ser. No. 09/370,766, filed Aug. 8, 1999 and assigned to the assignee of the present application, and the above-incorporated application Ser. No. 09/318,015—will employ the present inventive techniques to remain accessible to their employers, customers, clients, colleagues and others. The aforesaid application Ser. No. 09/370,766 is hereby incorporated by reference and considered set out in its entirety herein. Accordingly, references to CSRs in the context of illustrative virtual call centers will in appropriate cases be understood to include other personnel logging-in to a particular network or server. These personnel will include not only CSRs, multiple-location personnel, travelers and remotely located or in-the-field employees, but those at large personnel who—though not logged in—are reachable by appropriate alerting or messaging techniques.

The term virtual contact center should be understood to embrace such in-the-field, traveling or virtual office contexts, as well as illustrative virtual call center contexts described above and in some or all of the previously filed incorporated co-pending patent applications. Moreover, virtual contact center will be understood to include network-based systems, methods and techniques for processing voice and non-voice contacts, including instant messaging or other messaging contacts (such as chat, voice chat and e-mail contacts). The virtual contact center label is to be understood to apply whether customer or other contacts are referred to as calls, messages or otherwise.

As noted above, prompt information from a contact control server, illustratively a call control server, may be sent in the form of a message over the computer link to a CSR or other logging-in client. Thus, for example, a contact control server can specify the time, including substantially immediately—or within a specified time, in which a response to a specified prompt message should be made.

Numerous and varied alternative embodiments within the spirit of the above-described inventive teachings will fall within the scope of the attached claims.

What is claimed is:

1. In a network-based virtual contact center comprising a contact control server and at least one customer service representative (CSR) for serving voice contacts from customers, a method for authenticating a CSR for serving customer contacts, the method comprising;
   receiving at least one computer login message from a computer terminal claiming to be at a location from which a CSR seeks to be authenticated,
   sending a voice prompt to a voice terminal associated with said computer terminal, said voice prompt including a random sequence of signals,
   comparing a sequence of signals received from said computer terminal with an expected sequence of signals, and
   when said received sequence of signals bears a predetermined relationship to said signals included in said voice prompt, authenticating said CSR.

2. The method of claim 1 wherein said login message comprises a location to which said voice prompt is to be sent.

3. The method of claim 2 wherein said location comprises a PSTN number.

4. The method of claim 1 wherein said random sequence of signals comprises a random sequence of characters.

5. The method of claim 1 wherein said random sequence of signals is encrypted.

6. The method of claim 5 wherein said random sequence of signals is encrypted using a public key.

7. The method of claim 1 wherein said received sequence of signals is decrypted.

8. The method of claim 7 wherein said received sequence of signals is decrypted using a private key.

9. The method of claim 1 wherein said predetermined relationship is identity between said random sequence of signals sent in said voice prompt and said received sequence.

10. In a network-based virtual contact center comprising a contact control server and at least one customer service representative (CSR) for serving voice contacts from customers, a method for authenticating a CSR for serving customer contacts, the method comprising
   sending at least one computer login message from a CSR computer terminal location from which a CSR seeks to be authenticated to a contact control server,
   receiving a voice prompt at a voice terminal associated with said computer terminal, said voice prompt including a random sequence of signals,
   sending a response sequence of signals from said computer terminal to said contact control server, said response sequence bearing a predetermined relationship to said random sequence of signals.

11. The method of claim 10 wherein said login message comprises an identification of a location to which said voice prompt is to be sent.

12. The method of claim 11 wherein said location comprises a PSTN number.

13. The method of claim 10 wherein said random sequence of signals comprises a random sequence of characters.

14. The method of claim 13 wherein said random sequence of signals is encrypted.

15. The method of claim 14 wherein said random sequence of signals is encrypted using a public key.

16. The method of claim 14 wherein said received sequence of signals is decrypted to provide a basis for forming said response sequence.

17. The method of claim 15 wherein said received sequence of signals is decrypted using a private key.

18. The method of claim 10 wherein said predetermined relationship is identity between said random sequence of signals in said voice prompt and said response sequence.

19. In a network-based virtual contact center comprising a contact control server and at least one client station, a method for authenticating a client at said client station, the method comprising receiving at least one computer login message from said client station purporting to be a location from which said client seeks to be authenticated, sending a prompt to a terminal associated with said client station, said prompt including a random sequence of signals, comparing a sequence of signals received from said client station with an expected sequence of signals, and when said received sequence of signals bears a predetermined relationship to said signals included in said prompt, authenticating said client.

20. The method of claim 19 wherein said login message comprises information relating to address information to which said prompt is to be sent.

21. The method of claim 19 wherein said prompt is a voice prompt and said terminal is a voice terminal.

22. The method of claim 20 wherein said prompt is a voice prompt and wherein said login message identifies a telephone number to which said prompt is to be delivered.

* * * * *